Jan. 10, 1933.  W. T. WHITE  1,894,248

VEHICLE WHEEL

Filed May 31, 1930

Inventor

Will T. White

By Bee + Bush

Attorneys

Patented Jan. 10, 1933

1,894,248

UNITED STATES PATENT OFFICE

WILL T. WHITE, OF AKRON, OHIO, ASSIGNOR TO THE GOODYEAR TIRE & RUBBER COMPANY, OF AKRON, OHIO, A CORPORATION OF OHIO

VEHICLE WHEEL

Application filed May 31, 1930. Serial No. 457,864.

This invention relates to a vehicle wheel, and it has particular relation to that type of wheel upon which a pneumatic tire supporting rim is removably secured.

An object of the invention is to provide a device adapted to be disposed between the walls of a channel felloe, for reinforcing the latter and providing a support for a demountable rim.

Another object of the invention is to provide a device of the above-designated character, which can be manufactured inexpensively.

The invention constitutes an improvement of that construction disclosed in the patent to Darrow 1,676,820, issued July 10, 1928. It comprises a device adapted to be disposed between the flanges of a channel felloe, having a base resting on the latter, and axially extending walls projecting outwardly from the edges of the base. Portions of the outer edges of the walls of the device are inclined to the axis of the felloe, and provide an inclined seat for a rim having a correspondingly inclined seating surface. The ends of the device substantially contact with the flanges of the felloe, in order to reinforce the latter against axially directed bending stresses. Bolts projecting through the felloe are disposed between the walls of the device and clamps on the outer ends of the bolts force the rim over the inclined seat. The device preferably is constructed of cast metal.

Figure 1:
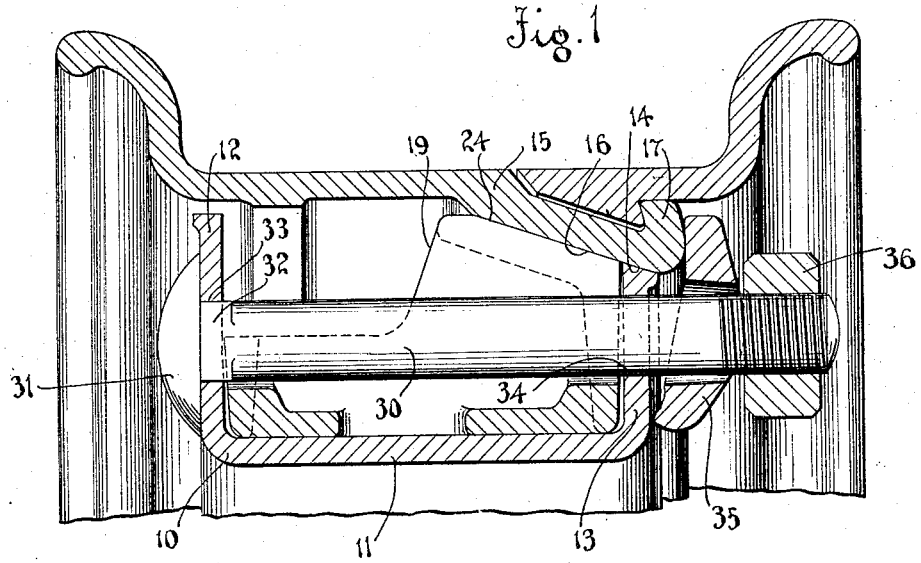
Figure 2:
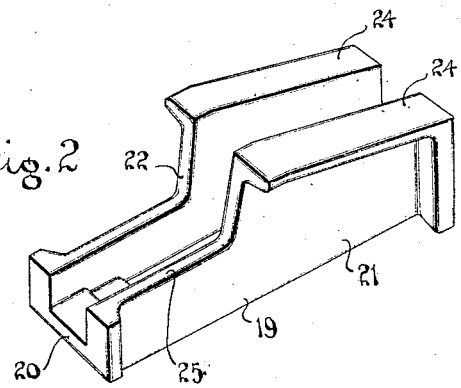

For a better understanding of the invention reference may now be had to the accompanying drawing forming a part of this specification, in which:

Fig. 1 is a cross-sectional view of a wheel constructed according to one embodiment of the invention; and Fig. 2 is a perspective view of a rim supporting device shown by Fig. 1 and which constitutes the principal subject matter of the invention.

Referring to Fig. 1, a felloe 10 comprises a base 11, an outwardly projecting inner radial flange 12 and an outer, similar flange 13. The outer edge of the flange 13 is of smaller diameter than that of the outer edge of the flange 12, and preferably is inclined as indicated at 14. The felloe is particularly adapted to support a rim 15 having a beveled portion 16 on its inner periphery, which terminates in a substantially radially disposed rib 17.

A device 19 disposed between the flanges 12 and 13 of the felloe, comprises a base 20 seated upon the base 11 of the felloe, and walls 21 and 22 normally projecting radially outwardly with respect to the base 11. The walls 21 and 22 extend substantially parallel to the axis of the felloe 11, and portions of their outer edges adjacent the flanges 13 of the felloe are inclined, as indicated at 24. Between the inclined edges 24 and the flange 12 of the felloe, the walls 21 and 22 of the device 19 are reduced in width, as indicated at 25, in order to prevent interference with the mounting of the rim 15 on the felloe, and to reduce the expense of construction. The inclination of the edges 24 of the walls 21 and 22, corresponds to the inclination of the edge 14 of the flange 13 on the felloe, and the inclined seat 16 on the rim, and, when the rim is mounted on the felloe, all of the inclined surfaces are disposed in substantially the same place.

In order to secure the rim on the felloe, a bolt 30 is provided which projects through the flanges 12 and 13 of the felloe, and between the walls 21 and 22 of the device 19. The inner end of the bolt is provided with a head 31 engaging the outer surface of the flange 12 to the felloe, and a square portion 32 disposed in a square opening 33 in such flange to prevent the bolt from turning. The outer end of the bolt projects through an opening 34 in the flange 13 of the felloe, and through a clamp 35 which engages at opposite ends, respectively, the rib 17 on the rim and the flange 13. A nut 36 threaded on the outer end of the bolt serves to move the clamp, which in turn moves the rim to its operative position on the inclined edges 24 of the device 19 and the inclined edge 14 on the flange 13 of the felloe.

A device such as that described, can be manufactured inexpensively, primarily because of its simple construction and the ease with which it may be cast from metal. It serves as a rigid support for a rim, and as a rigid reinforcing member for preventing bending of the flanges of the felloe toward each other when the nuts on the bolts are tightened. It should be understood that a plurality of such devices are disposed on the felloe in circumferentially spaced relation and that the number of bolts and clamps corresponds to the number of such devices.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. In combination, a wheel having a channel felloe, a rim having an inclined seat, a channel shaped device extending transversely of the channel felloe, the device having walls parallel to the axis of the wheel, the base of the channel shaped device engaging the base of the channel felloe, a bolt extending through the sides of the channel felloe and loosely through the channel of the device to provide for free relative rotation between the device and the bolt, the edges of the walls opposite the base of the channel shaped device being inclined to form a seat to receive the inclined seat of the rim.

2. In combination, a wheel having a channel felloe, a rim having an inclined seat, a channel shaped device extending transversely of the channel felloe, the device having walls parallel to the axis of the wheel, a bolt extending through the sides of the channel felloe and loosely through the channel of the device to provide for free relative rotation between the device and the bolt, the channel shaped device being inclined to form a seat to receive the inclined seat of the rim.

In witness whereof I have hereunto signed by name at Akron, in the county of Summit and State of Ohio, U. S. A., this 29th day of May, 1930.

WILL T. WHITE.